United States Patent
Kodama

(10) Patent No.: US 11,949,824 B2
(45) Date of Patent: Apr. 2, 2024

(54) IMAGE FORMING APPARATUS AND METHOD FOR NOTIFYING DETECTION OF VIRUS

(71) Applicant: SHARP KABUSHIKI KAISHA, Sakai (JP)

(72) Inventor: Naoki Kodama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/234,371

(22) Filed: Aug. 16, 2023

(65) Prior Publication Data

US 2024/0073333 A1 Feb. 29, 2024

(30) Foreign Application Priority Data

Aug. 23, 2022 (JP) ................. 2022-132362

(51) Int. Cl.
*H04N 1/00* (2006.01)
*G06F 21/56* (2013.01)

(52) U.S. Cl.
CPC ......... *H04N 1/00472* (2013.01); *G06F 21/56* (2013.01); *G06F 2221/033* (2013.01)

(58) Field of Classification Search
CPC ................................................ H04N 1/00472
See application file for complete search history.

(56) References Cited

U.S. PATENT DOCUMENTS

| | | | |
|---|---|---|---|
| 2011/0032567 A1* | 2/2011 | Ishida | H04N 1/00347 358/1.15 |
| 2018/0084142 A1* | 3/2018 | Kamoi | H04N 1/32662 |
| 2019/0004751 A1* | 1/2019 | Ikeda | G06F 3/04842 |
| 2019/0327368 A1* | 10/2019 | Sugimoto | G06F 21/84 |
| 2020/0034555 A1 | 1/2020 | Ohno et al. | |
| 2021/0195049 A1* | 6/2021 | Ikawa | G06F 8/65 |
| 2023/0117536 A1* | 4/2023 | Sugiura | G06F 3/1238 358/1.15 |

FOREIGN PATENT DOCUMENTS

JP 2020-017818 A 1/2020

* cited by examiner

*Primary Examiner* — Benjamin O Dulaney

(74) *Attorney, Agent, or Firm* — ScienBiziP, P.C.

(57) ABSTRACT

Provided is an image forming apparatus including a display, an authenticator, an image former, a detector, and one or more controllers. The authenticator authenticates a user's login to the image forming apparatus. The image former forms an image based on a job for which an execution instruction has been inputted by the user. The detector performs virus detection at execution of the job. The one or more controllers control display of notification information that notifies a detection of a virus. The one or more controllers control the display of the notification information depending on the user's login status on the image forming apparatus at the time of the detection of a virus.

9 Claims, 19 Drawing Sheets

FIG. 3

| JOB MANAGEMENT TABLE | | | | | | |
|---|---|---|---|---|---|---|
| JOB ID | INPUT TIME | JOB TYPE | USER NAME | NUMBER OF SETS | FILE NAME | STATUS |
| 0101 | 2020/04/01 14:10 | PRINT | USER A | 0010 | ABC.pdf | WAITING |
| 0100 | 2020/04/01 14:05 | PRINT | USER B | 0005 | DEF.jpg | IN EXECUTION |
| 0099 | 2020/04/01 14:02 | PRINT | USER A | 0003 | GHI.png | COMPLETED |
| ⋮ | ⋮ | ⋮ | ⋮ | ⋮ | ⋮ | ⋮ |

FIG. 4

| NOTIFICATION METHOD MANAGEMENT TABLE | | | |
|---|---|---|---|
| PATTERN | NOTIFICATION METHOD TO BE EMPLOYED UPON DETECTION | NOTIFICATION SCREEN DISPLAY | NOTIFICATION METHOD TO BE EMPLOYED UPON SELECTION |
| #01 | POP-UP MESSAGE | No | — |
| #02 | ICON | Yes | POP-UP MESSAGE |
| ⋮ | ⋮ | ⋮ | ⋮ |

IMAGE FORMING APPARATUS AND METHOD FOR NOTIFYING DETECTION OF VIRUS

BACKGROUND OF THE INVENTION

Field of the Invention

The present disclosure relates to an image forming apparatus and the like.

Description of the Background Art

Some image forming apparatuses, such as multifunction peripherals, register jobs directly inputted by users at the image forming apparatuses through an operation screen or the like (hereinafter referred to as "walk-up jobs") in a spool queue and execute the registered jobs in sequence. The walk-up jobs registered in the spool queue are processed in the order of their historical registration, starting with the oldest job.

Incidentally, a computer virus (hereinafter, simply referred to as a "virus") contained in data inputted to an apparatus should be prevented from infecting and taking over the apparatus or spreading to other apparatuses connected via a network or the like. To this end, a known image forming apparatus displays a notification on an operation panel or the like when data containing a virus is detected.

In order to minimize the damage to be caused by virus infection, it is necessary for an executing user who has inputted a walk-up job to quickly and accurately learn the fact that data pertaining to the walk-up job is infected with a virus.

However, in the case of a direct print job, which is an example of a walk-up job, the print job is registered, file data is analyzed, and then virus detection is performed when the data is converted to image data for printing. In the case of an image transmission job, which is another example of a walk-up job, the image transmission job is registered, and then virus detection is performed in the course of converting a read image to an image format for transmission.

If there is a time difference between when a walk-up job is inputted and when virus detection is performed at the execution of this walk-up job as described above, the executing user who has inputted the walk-up job can leave the image forming apparatus before the user's walk-up job is completed. Moreover, since walk-up jobs registered in a spool queue are executed in the job registration order, the time difference is larger, and the likelihood that the executing user will leave the image forming apparatus is even higher when more walk-up jobs are registered.

In such cases, even if a virus is detected in data pertaining to a walk-up job, there are still some remaining issues. For example, the executing user who has inputted the walk-up job can fail to learn the detection of a virus, the detection of a virus can be notified to another user, confusing the user, or a notification of the detection of a virus can be displayed while another user is operating the image forming apparatus, interfering with the user's operation.

An objective of the present disclosure is to provide an image forming apparatus and the like that allows an executing user who has inputted a walk-up job to quickly and accurately learn the fact that data pertaining to the walk-up job is infected with a virus, without interfering with another user's operation.

SUMMARY OF THE INVENTION

In order to solve the problems described above, an image forming apparatus according to an aspect of the present disclosure includes: a display; an authenticator that authenticates a user's login to the image forming apparatus; an image former that forms an image based on a job for which an execution instruction has been inputted by the user; a detector that performs virus detection at execution of the job; and one or more controllers that control display of notification information that notifies a detection of a virus, wherein the one or more controllers control the display of the notification information depending on the user's login status on the image forming apparatus at the time of the detection of a virus.

A method for notifying a detection of a virus according to another aspect of the present disclosure includes: authenticating a user's login to an apparatus; forming an image based on a job for which an execution instruction has been inputted by the user; performing virus detection at execution of the job; and controlling display of notification information that notifies a detection of a virus, wherein the display of the notification information is controlled depending on the user's login status on the apparatus at the time of the detection of a virus.

According to the present disclosure, it is possible to provide an image forming apparatus and the like that allows an executing user who has inputted a walk-up job to quickly and accurately learn the fact that data pertaining to the walk-up job is infected with a virus, without interfering with another user's operation.

BRIEF DESCRIPTION OF THE DRAWINGS

FIG. 3 is a diagram for describing a job management table.

FIG. 4 is a diagram for describing a notification method management table.

DESCRIPTION OF THE PREFERRED EMBODIMENTS

The following describes embodiments of the present disclosure with reference to the accompanying drawings. In the present disclosure, a multifunction peripheral that can perform jobs based on multiple functions, such as print, copy, scan, fax, and Internet fax functions, within a single housing will be described as one form of an image forming apparatus. Note that the embodiments described below are examples for explaining the present disclosure, and the technical scope of the description set forth in the claims is not limited to the following description.

1. First Embodiment

An apparatus according to a first embodiment includes: a display; an authenticator that authenticates a user's login to the apparatus; an image former that forms an image based on a job for which an execution instruction has been inputted by the user; a detector that detects a virus at execution of the job; and a controller that controls display of notification information that notifies a detection of a virus, wherein the controller controls display of the notification information depending on the user's login status on the apparatus at the time of the detection of a virus. The following describes, as the first embodiment, a form in which the method for displaying the notification information is varied depending on the user's login status.

1.1. Functional Configuration

Figure 1:
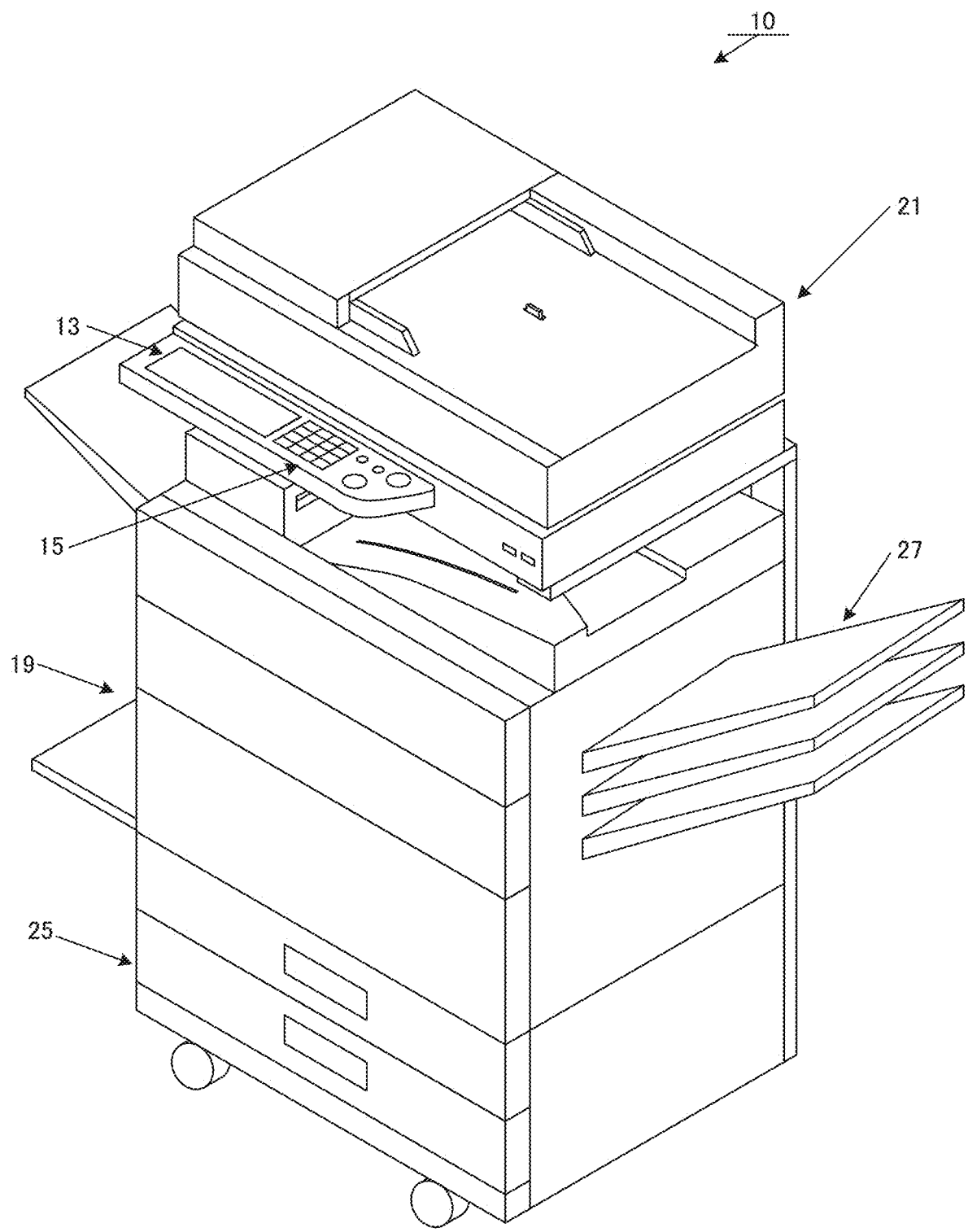
FIG. 1 is an external perspective view of a multifunction peripheral according to a first embodiment.
Figure 2:
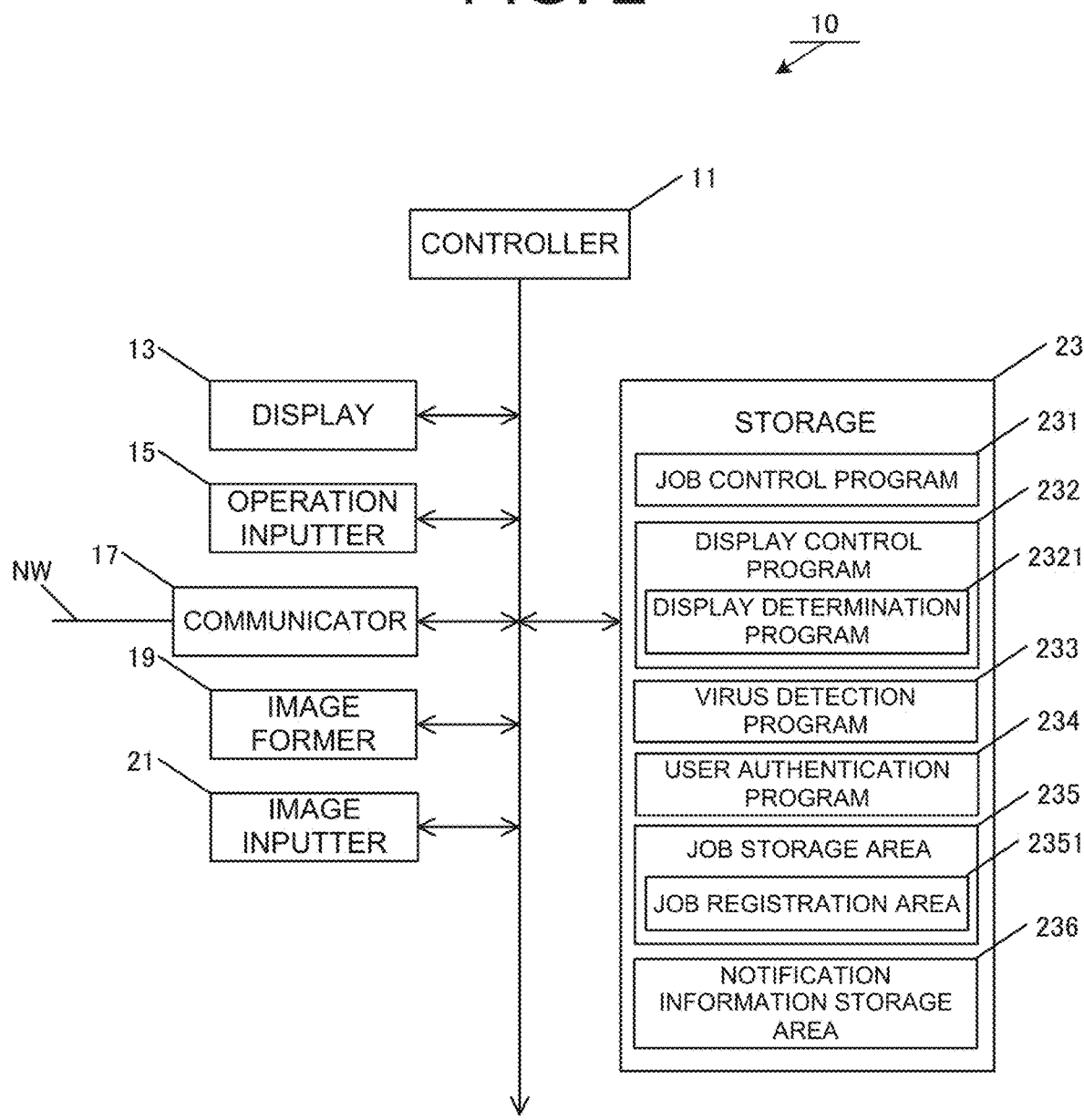
FIG. 2 is a diagram illustrating a functional configuration of the multifunction peripheral according to the first embodiment.

A functional configuration of a multifunction peripheral 10 according to the first embodiment will be described with reference to FIGS. 1 and 2. FIG. 1 is an external perspective view for schematically illustrating an overall configuration of the multifunction peripheral 10. FIG. 2 is a diagram illustrating a functional configuration of the multifunction peripheral 10. The multifunction peripheral 10 includes a controller 11, a display 13, an operation inputter 15, a communicator 17, an image former 19, an image inputter 21, and a storage 23.

The controller 11 performs overall control of the multifunction peripheral 10. The controller 11 includes, for example, one or more arithmetic devices (such as central processing units (CPUs)). The controller 11 reads and executes various programs stored in the storage 23, so that functions thereof are implemented.

The display 13 displays various types of information for a user, for example. The display 13 may include, for example, a liquid crystal display (LCD) or an organic electro-luminescence (EL) display. The display 13 can display, for example, notification information (pop-up message) indicating that data pertaining to a walk-up job is infected with a virus and an icon for receiving an instruction to display the notification information based on the control by the controller 11 that has read a display control program 232 described below.

The operation inputter 15 receives input of information by, for example, a user. The operation inputter 15 may include, for example, hard keys (for example, a numeric keypad) and buttons. Note that the operation inputter 15 can be configured as a touch panel that allows input through the display 13. In this case, for example, the touch panel may adopt, as an input method thereof, a common method such as a resistive method, an infrared method, an inductive method, or a capacitive method. An executing user who executes a walk-up job can input or select data pertaining to the execution of the walk-up job and input an execution instruction for the job via the touch panel.

The communicator 17 includes, for example, either or both of a wired interface and a wireless interface to communicate with other devices via a network (NW) such as a local area network (LAN), a wide area network (WAN), the Internet, a telephone line, or a facsimile line.

The image former 19 forms an image on paper, which is a recording medium, based on image data. The image former 19 feeds paper from a paper feeder 25, forms an image on the paper based on image data, and then discharges the paper to a paper discharger 27. The image former 19 may include, for example, an electrophotographic laser printer. In this case, the image former 19 forms images using toners supplied from toner cartridges, not shown, corresponding to respective toner colors (for example, cyan, magenta, yellow, and black).

The image inputter 21 scans and reads a document to generate image data. The image inputter 21 may be, for example, configured as a scanner device including an image sensor such as a charge coupled device (CCD) or a contact image sensor (CIS) and having an automatic document feeder (ADF). No particular limitations are placed on the configuration of the image inputter 21 as long as the image inputter 21 is configured to generate image data by reading a reflected light image from a document image using an image sensor. Note that in the present disclosure, the image inputter 21 can be, for example, configured as an interface that allows for acquisition of image data stored in a portable storage medium such as universal serial bus (USB) memory or image data transmitted from an external device, not shown, via the communicator 17.

The storage 23 stores therein various programs necessary for operation of the multifunction peripheral 10 and various types of data. The storage 23 may include, for example, storage devices such as random access memory (RAM), a hard disk drive (HDD), a solid state drive (SSD), and read only memory (ROM).

In the first embodiment, the storage 23 stores therein a job control program 231, the display control program 232, a virus detection program 233, and a user authentication program 234. In the storage 23, a job storage area 235 and a notification information storage area 236 are reserved.

The controller 11 reads the job control program 231 in order to perform processing at execution of functions such as print, copy, scan, fax, and Internet fax functions on a per-job basis. The controller 11 that has read the job control program 231 can control a job executor, which specifically is the communicator 17, the image former 19, or the image inputter 21, to execute a job such as a walk-up job or a remote job based on remote operation from an external device, not shown.

The controller 11 reads the display control program 232 when controlling display of a display screen through the display 13. The controller 11 that has read the display control program 232 can display, on the display 13, various screens such as a setting screen for receiving direct input of various setting values and the like related to the execution of the walk-up job, a home screen, which is a default screen, for receiving operation mode switching instructions and the like, and a login screen for user authentication. The display control program 232 includes a display determination program 2321. The controller 11 that has read the display determination program 2321 determines, based on the login status of the executing user or the like who has inputted an execution instruction for the walk-up job, whether to display the fact that the data pertaining to the walk-up job is infected with a virus in the form of notification information (pop-up message) or in the form of an icon for receiving an instruction to display the notification information.

The controller 11 reads the virus detection program 233 for virus detection or for receiving settings related to the virus detection. The controller 11 that has read the virus detection program 233 functions as a detector and detects whether or not the data pertaining to the walk-up job is infected with a virus through pattern matching against a virus definition file, not shown.

The controller 11 reads the user authentication program 234 when authenticating a user attempting to log in to the multifunction peripheral 10. The controller 11 that has read the user authentication program 234 functions as an authenticator. When a user authentication function is enabled, the controller 11 displays the login screen on the display 13, and receives entry of a login user name and a login password. The controller 11 has pre-stored login user names and their associated login passwords for user authentication, and can perform user login authentication by verifying the login user name and the login password entered through the login screen. In addition to knowledge-based authentication based on entry of a login user name and a login password, the controller 11 may employ other methods to perform the login authentication, such as possession-based authentication using, for example, a token, a key, an integrated circuit (IC) card, or a smartphone, or biometric authentication like facial recognition or fingerprint recognition. Note that the controller 11 can switch between enabling and disabling the user authentication function based on settings configured through a setting screen, not shown.

In the job storage area 235, walk-up jobs and remote jobs to be executed are stored. The job storage area 235 includes a job registration area 2351 in which a job management table is stored for registering and managing walk-up jobs and remote jobs in a spool queue.

The following now describes the job management table with reference to FIG. 3. FIG. 3 is a diagram illustrating a configuration example of a data structure of the job management table. In the job management table, based on an execution instruction for a job received through a job execution screen described below, the job is registered in a spool queue. The job management table of the present embodiment is described as taking a form in which print jobs related to direct printing are managed as walk-up jobs in a spool queue. Alternatively, the job management table may take a form in which walk-up jobs and remote jobs are managed in the order of job input, or a form in which jobs that belong to different job types, such as copy, scan, fax, and Internet fax jobs, besides print jobs are managed together.

The job management table includes "Job ID", "Input time", "Job type", "User name", "Number of sets", "File name", and "Status" as management items.

The "Job ID" refers to an identifier for uniquely identifying each registered walk-up job (spool queue). The "Input time" refers to a clock time of input of each walk-up job. In this case, the "Input time" may be a clock time of input of an execution instruction for each job. The "Job type" refers to a job type of each walk-up job identified by a Job ID. The "User name" refers to a name of an executing user who has inputted the execution instruction for each walk-up job. The "Number of sets" refers to the number of copies to be printed for each walk-up job that belongs to a job type "Print". The "File name" refers to a file name of image data to be used for printing an image. Note that information on a location where the image data is stored or acquired from, for example, may be registered in the file name. The "Status" refers to an execution status of each walk-up job and is, for example, any of "Waiting", "In execution", or "Completed". The controller 11 updates the status from "Waiting" to "In execution" or "Completed", depending on the execution status of the job for which the execution instruction has been received.

For example, the job management table shows that a job identified by a job ID "0101" is a print job that belongs to the job type "Print" for which an execution instruction was inputted at an input time "2020/04/01 14:10". This print job represents an example in which a user having a user name "User A" set image data "ABC.pdf" as data to be used for printing an image and a number of sets "010" as the number of copies to be printed. The status of the print job identified by the job ID "0101" is "Waiting".

The controller 11 that has read the job control program 231 executes the walk-up jobs being managed in the job management table in the order of job registration in the spool queue. In the example shown in FIG. 3, a walk-up job identified by a job ID "0099" has already been executed (status: "Completed"), and a walk-up job identified by a job ID "0100" is in execution (status: "In execution").

Returning to FIG. 2, in the notification information storage area 236, notification content of notification information (pop-up message) notifying that data is infected with a virus, image information that represents an icon for receiving an instruction to display the notification information, and other information is stored. Furthermore, a notification method management table is stored in the notification information storage area 236 for managing notification methods of notification information notifying that data pertaining to a walk-up job is infected with a virus.

The following now describes the notification method management table with reference to FIG. 4. FIG. 4 is a diagram illustrating a configuration example of a data structure of the notification method management table. The notification method management table includes "Pattern", "Notification method to be employed upon detection", "Notification screen display", and "Notification method to be employed upon selection" as management items.

The "Pattern" refers to an identifier for uniquely identifying each notification method of notification information. The "Notification method to be employed upon detection" specifies a notification method to be employed upon a detection of a virus. The "Notification screen display" refers to a flag that specifies whether or not a notification screen for displaying apparatus status is to be displayed. The "Notification method to be employed upon selection" specifies a notification method of notification information to be employed upon a selection of information related to a detection of a virus displayed on the notification screen.

For example, by a notification method identified by a pattern "#01", the controller 11 uses a pop-up message to display notification information notifying that data pertaining to a walk-up job is infected with a virus. In this case, the controller 11 does not display the notification screen (notification screen display: "No").

On the other hand, by a notification method identified by a pattern "#02", the controller 11 uses an icon to indicate that data pertaining to a walk-up job is infected with a virus. Then, when a user selects the icon, the controller 11 displays the notification screen (notification screen display: "Yes"). Then, when the user selects the information related to the detection of a virus displayed on the notification screen, the controller 11 displays the notification information using a pop-up message (notification method to be employed upon selection: "Pop-up message").

1.2. Flow of Processing

Figure 5:
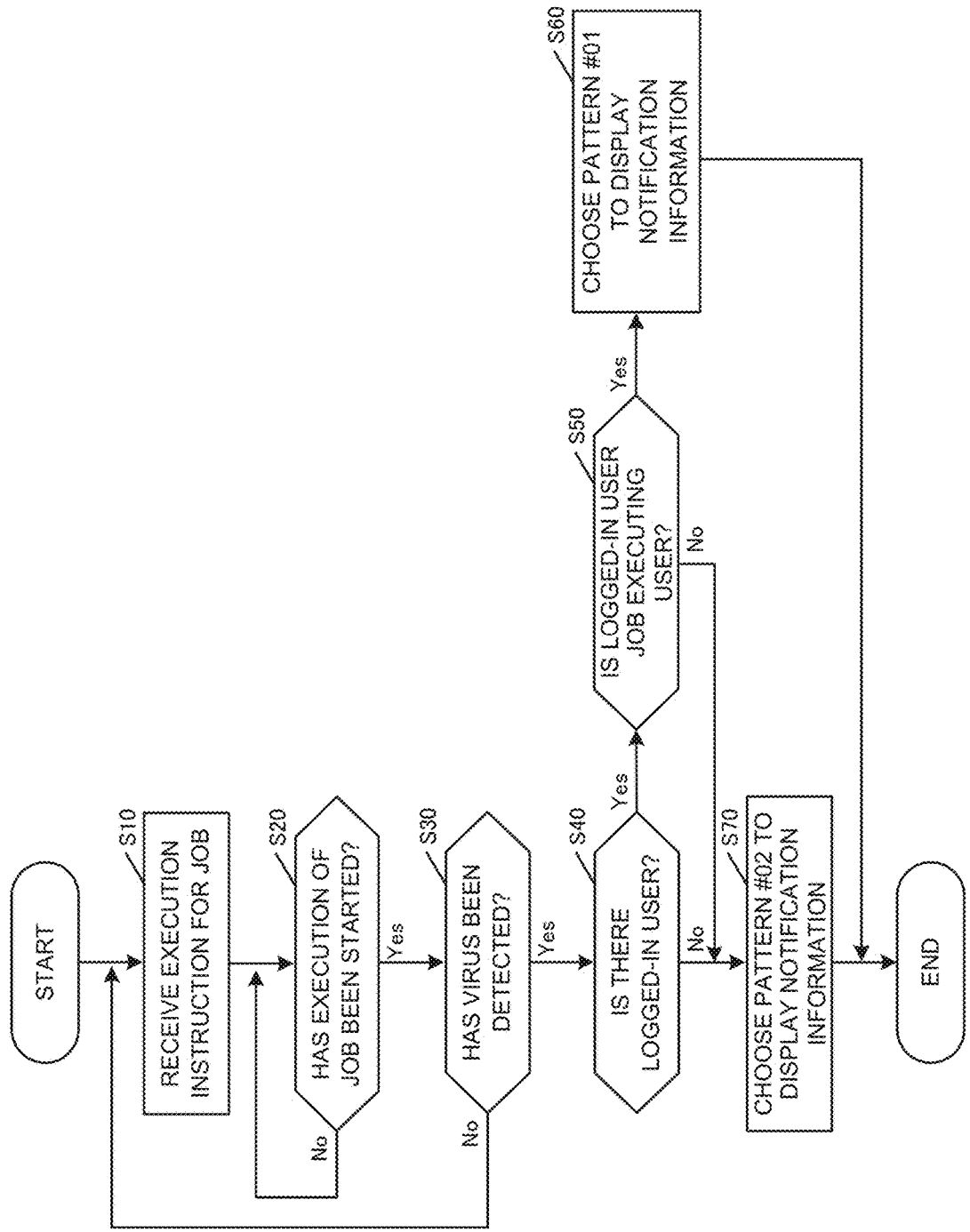
FIG. 5 is a flowchart for describing a flow of processing according to the first embodiment.

The following describes a flow of processing according to the first embodiment with reference to a flowchart in FIG. 5. The controller 11 performs the processing described with reference to FIG. 5 by reading, for example, the job control program 231, the display control program 232, the virus detection program 233, and the user authentication program 234.

First, the controller 11 receives an execution instruction for a walk-up job inputted by a user (Step S10). Upon receiving the execution instruction inputted for the walk-up job, the controller 11 registers the thus received walk-up job in a spool queue.

Then, the controller 11 determines whether or not the execution of the walk-up job in the spool queue has been started (Step S20). Upon determining that the execution of the walk-up job has been started, the controller 11 determines whether or not a virus has been detected in data pertaining to the walk-up job (Yes in Step S20-->Step S30). Upon determining that the execution of the walk-up job has not been started, the controller 11 waits until it is time to execute the walk-up job (No in Step S20).

Upon determining that a virus has been detected in the data pertaining to the walk-up job for which the execution has been started, the controller 11 determines whether or not there is a user logged in to the multifunction peripheral 10 (Yes in Step S30-->Step S40). On the other hand, upon determining that no virus has been detected in the data pertaining to the walk-up job for which the execution has been started, the controller 11 returns the processing to Step S10 and waits until an execution instruction for a walk-up job is inputted (No in Step S30-->Step S10). Note that upon determining that no virus has been detected in the data pertaining to the walk-up job for which the execution has been started, the controller 11 may omit processes in Step S40 and subsequent steps and terminate the processing.

Upon determining that there is a user logged in to the multifunction peripheral 10, the controller 11 determines whether or not the logged-in user is the executing user who has inputted the execution instruction for the walk-up job (Yes in Step S40-->Step S50). In this case, the controller 11 can determine whether or not the logged-in user and the executing user are the same user by referring to the job management table shown in FIG. 3. Upon determining that the logged-in user is the executing user who has inputted the execution instruction for the walk-up job, the controller 11 chooses the notification method identified by the pattern "#01" shown as an example in FIG. 4 to display the notification information (Yes in Step S50-->Step S60).

On the other hand, upon determining that there is no user logged in to the multifunction peripheral 10 (No in Step S40), or upon determining that the logged-in user is not the executing user who has inputted the execution instruction for the job (No in Step S50), the controller 11 chooses the notification method identified by the pattern "#02" shown as an example in FIG. 4 to display the notification information (Step S70).

1.3. Operation Examples

Figure 6:
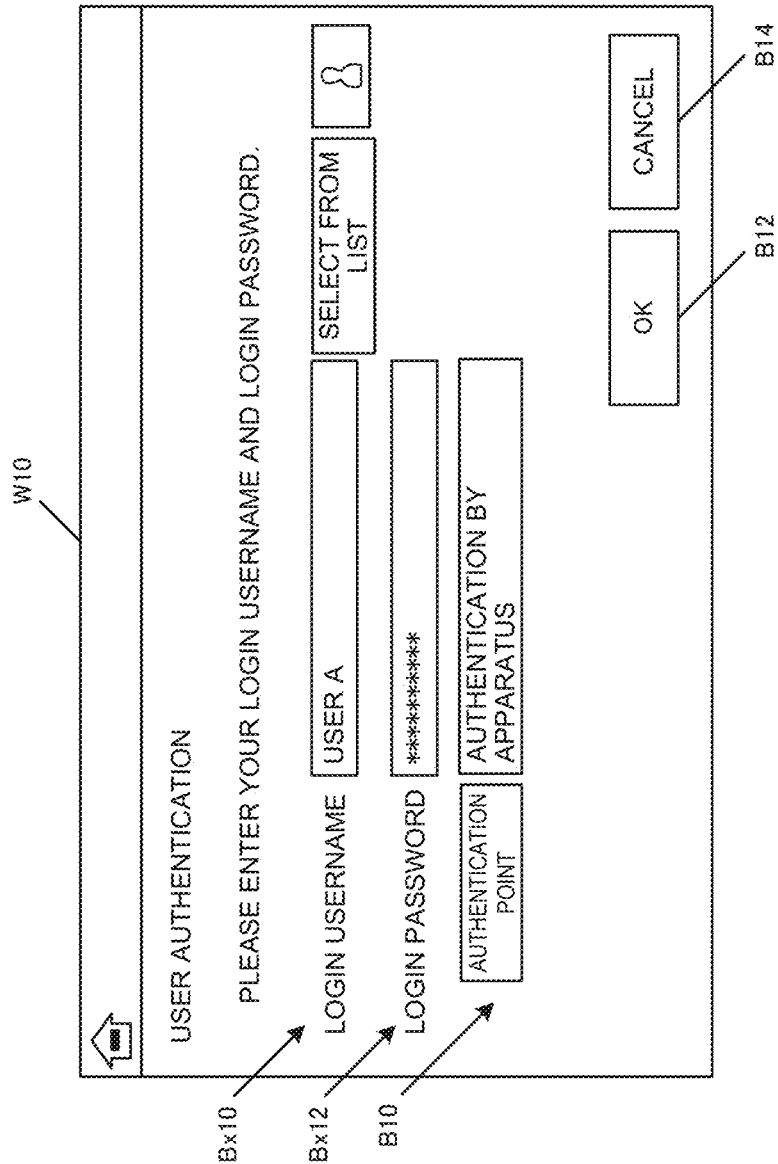
FIG. 6 is a diagram for describing an operation example according to the first embodiment.

The following describes operation examples according to the first embodiment. FIG. 6 is a diagram illustrating a configuration example of a user authentication screen W10 to be displayed on the display 13 by the controller 11. The user authentication screen W10 may be configured as a login screen to be displayed on the display 13 by the controller 11 that has read the user authentication program 234 when the user authentication function is enabled.

The user authentication screen W10 has a login user name entry box Bx10, a login password entry box Bx12, an authentication point designation button B10, an OK button B12, and a cancel button B14.

The login user name entry box Bx10 receives entry of a login user name of a user attempting to log in to the multifunction peripheral 10. Note that the login user name may be entered directly using an input device such as a keyboard, or may be selected from a list of user names displayed as a result of a user pressing a selection button from a separately provided list.

The login password entry box Bx12 receives entry of a login password corresponding to the login user name. A user attempting to log in to the multifunction peripheral 10 enters a login password along with a login user name.

The authentication point designation button B10 receives designation of a user authentication point. The user authentication point may be the apparatus itself or may be, for example, an authentication server separately provided on the network (NW). In a case where the apparatus itself is designated as the user authentication point, the controller 11 performs the user authentication by comparing the entered login user name and login password against authentication information prepared in advance (for example, combinations of user names and passwords). On the other hand, in a case where the authentication server on the network (NW) is designated as the user authentication point, the controller 11 performs the user authentication by transmitting the entered login user name and login password to the authentication server, and receiving the authentication result from the authentication server.

The OK button B12 receives an instruction to confirm the user's entry operation. The user selects the OK button B12 to confirm the entry into the login user name entry box Bx10 or the login password entry box Bx12 and the designation of the user authentication point through the authentication point designation button B10. The cancel button B14 receives an instruction to cancel the user's entry operation.

Figure 7:
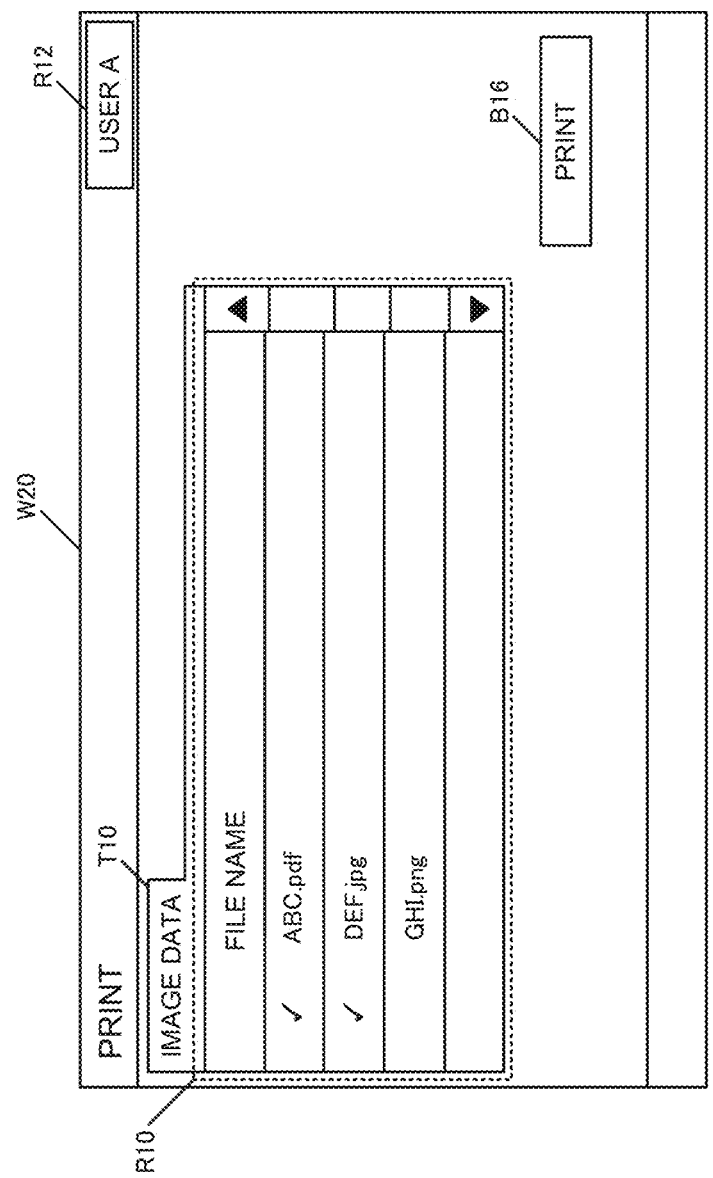
FIG. 7 is a diagram for describing an operation example according to the first embodiment.

FIG. 7 is a diagram illustrating a configuration example of a print job execution screen W20 for receiving input of an execution instruction for a walk-up job. The print job execution screen W20 includes an image data selection tab T10, a login user name display area R12, and a print button B16.

The image data selection tab T10 receives a selection of image data to be used to execute the walk-up job (print job). The image data selection tab T10 includes a file name display area R10 for displaying image data (file name(s)) usable to execute the walk-up job.

In the file name display area R10, image data displayed by file name can be selected by the user. Upon the user selecting desired image data to be used to execute the walk-up job, as illustrated in FIG. 7, the controller 11 places a check mark(s) on corresponding image data (ABC.pdf, DEF.jpg) and indicates that the image data has been selected.

In the login user name display area R12, the login user name of the user who has logged in to the multifunction peripheral 10 through the user authentication screen W10 illustrated in FIG. 6 is displayed.

The print button B16 receives a print instruction for image data selected by the user. Upon the user selecting the print button B16, the controller 11 accepts the print job based on the selected image data and registers the print job in a spool queue in the job management table shown as an example in FIG. 3.

Figure 8:
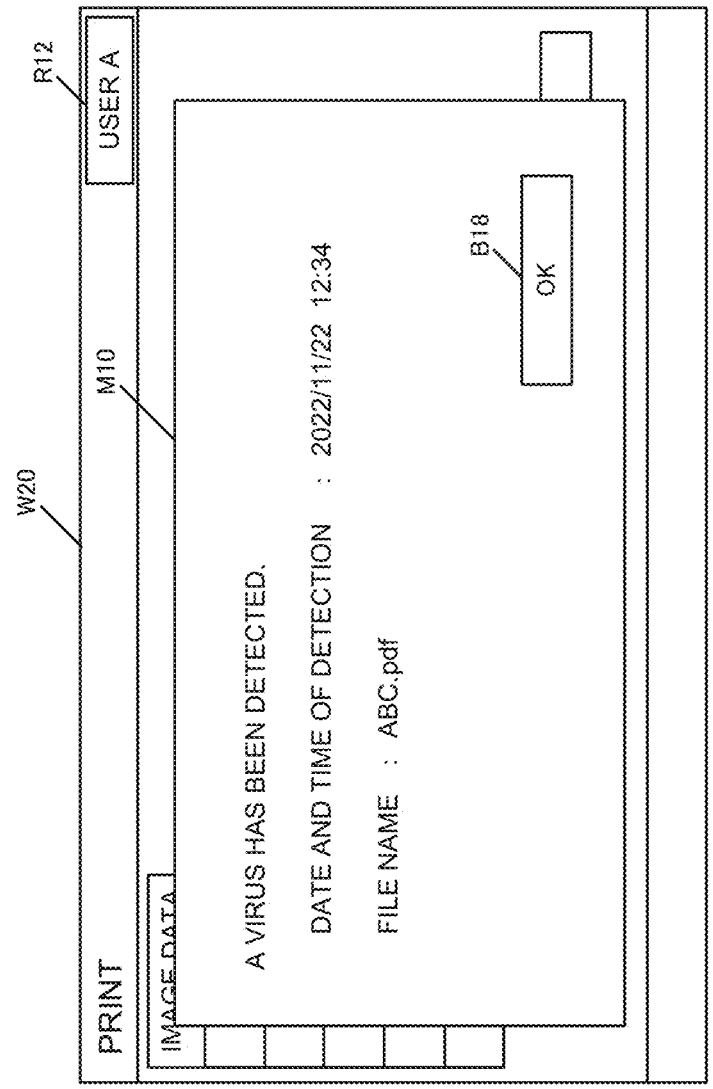
FIG. 8 is a diagram for describing an operation example according to the first embodiment.

FIG. 8 is a diagram illustrating an operation example in the case where a virus is detected in the image data pertaining to the walk-up job as a result of the virus detection performed at the execution of the walk-up job. The operation example illustrated in FIG. 8 corresponds to the case where the controller 11 has determined that the user logged in to the multifunction peripheral 10 at the time of the execution of the walk-up job is the executing user who has inputted the execution instruction for the walk-up job (corresponding to the processes in the case of Yes in Step S50-->Step S60 in FIG. 5). Note that the operation example illustrated in FIG. 8 is described on the assumption that a virus is detected during the execution of the print job based on the image data having the file name "ABC.pdf".

Upon determining that the user logged in to the multifunction peripheral 10 at the time of the execution of the walk-up job (User A being displayed in the login user name display area R12) is the executing user who has inputted the execution instruction for the walk-up job (User A (see the job management table in FIG. 3)), the controller 11 chooses the pattern "#01" to display the notification information. In this case, the controller 11 displays the notification information notifying that the data pertaining to the walk-up job is infected with a virus in the form of a pop-up message M10.

The pop-up message M10 includes an OK button B18, and a display area for displaying, as the notification information, a message indicating a detection of a virus "A virus has been detected.", the date and time of the detection "2022/11/22 12:34", and the file name "ABC.pdf". The OK button B18 receives acknowledgement of the logged-in user who has seen the content of the notification information. In response to the user selecting the OK button B18, the controller 11 stops displaying the pop-up message M10 and returns the display screen to the print job execution screen W20.

Figure 9:
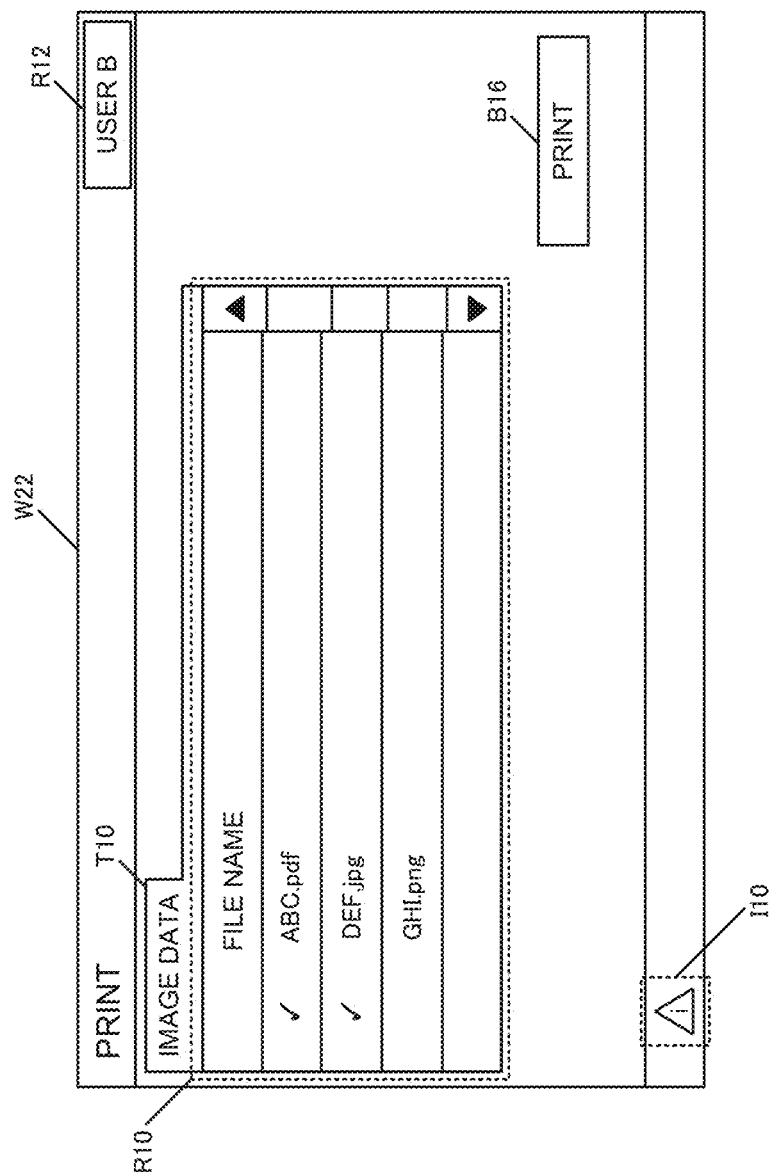
FIG. 9 is a diagram for describing an operation example according to the first embodiment.

FIG. 9 is a diagram illustrating an operation example corresponding to the case where the controller 11 has determined that the user logged in to the multifunction peripheral 10 at the time of the execution of the walk-up job is not the executing user who has inputted the execution instruction for the walk-up job (corresponding to the processes in the case of No in Step S50-->Step S70 in FIG. 5).

Upon determining that the user logged in to the multifunction peripheral 10 at the time of the execution of the walk-up job (User B being displayed in the login user name display area R12) is not the executing user who has inputted the execution instruction for the walk-up job (User A (see the job management table in FIG. 3)), the controller 11 chooses the pattern "#02" to display the notification information. In this case, the controller 11 indicates the fact that the data pertaining to the walk-up job is infected with a virus in the form of an icon I10 on a print job execution screen W22.

Figure 10:
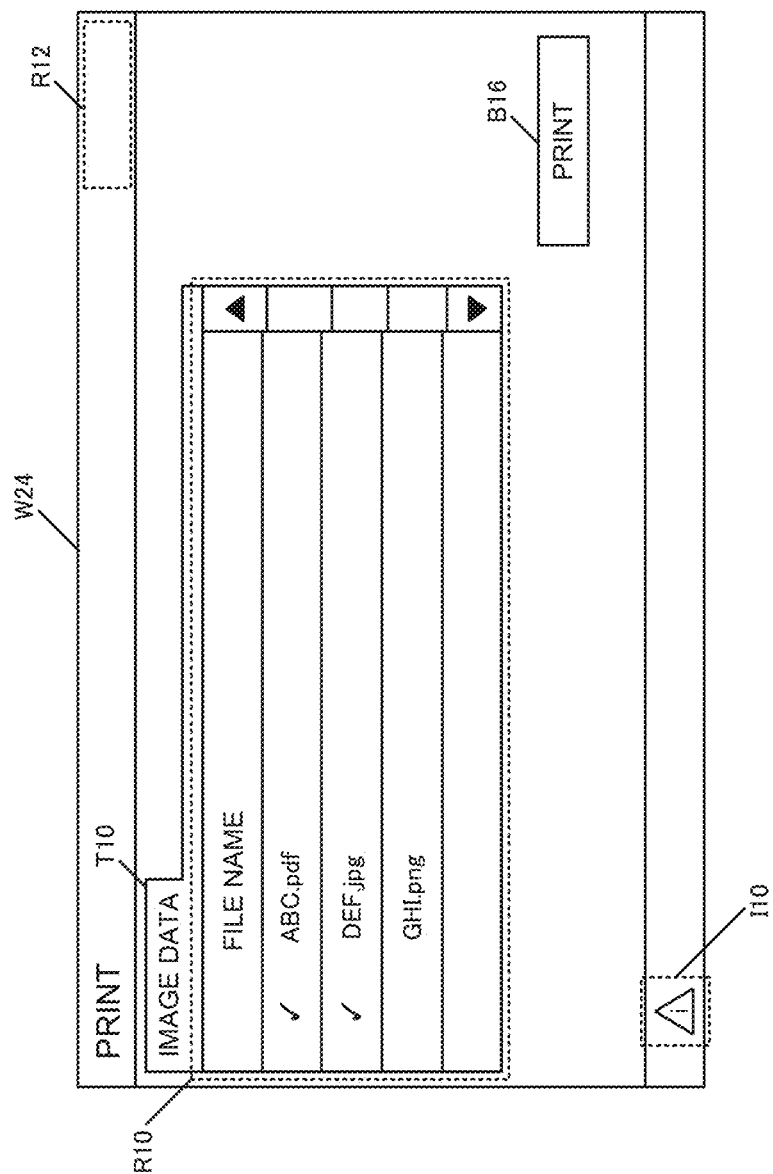
FIG. 10 is a diagram for describing an operation example according to the first embodiment.

FIG. 10 is a diagram illustrating an operation example corresponding to the case where neither the executing user nor any other user is logged in to the multifunction peripheral 10 at the time of the execution of the walk-up job (corresponding to the processes in the case of No in Step S40-->Step S70 in FIG. 5).

Upon determining that neither the executing user nor any other user is logged in to the multifunction peripheral 10 at the time of the execution of the walk-up job, the controller 11 chooses the pattern "#02" to display the notification information. In this case, the controller 11 indicates the fact that the data pertaining to the walk-up job is infected with a virus in the form of the icon I10 on a print job execution screen W24.

Figure 11:
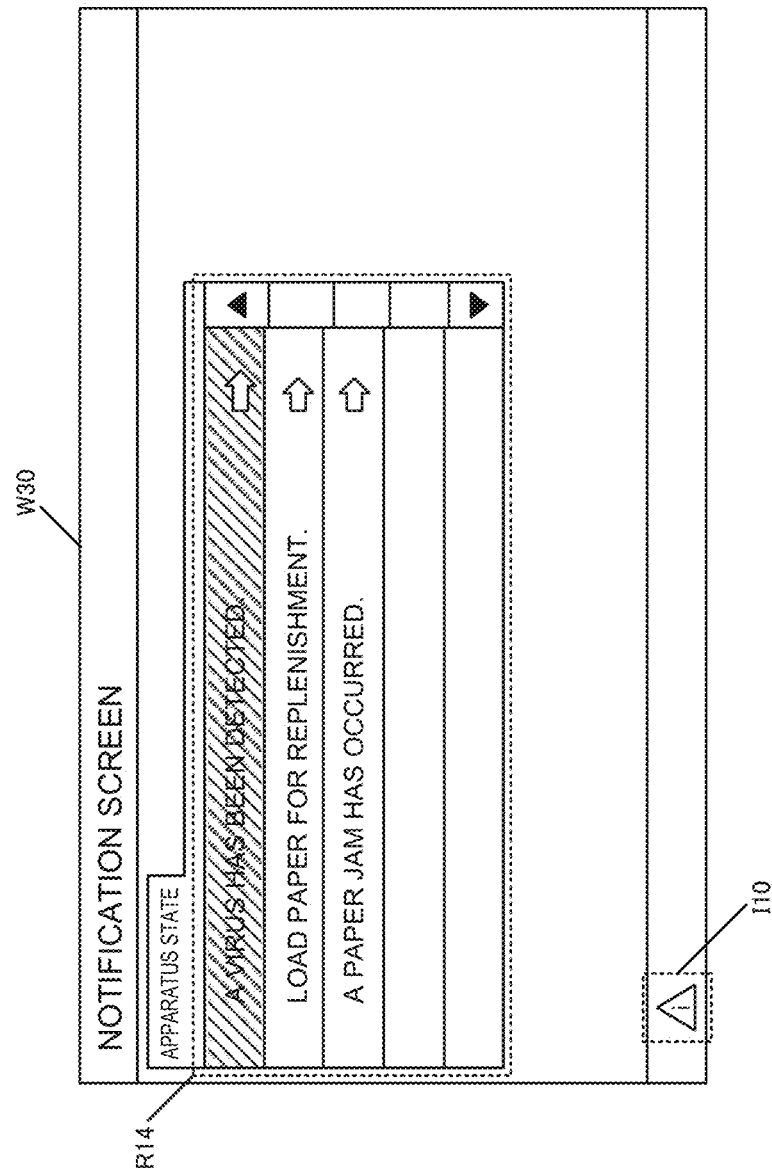
FIG. 11 is a diagram for describing an operation example according to the first embodiment.

FIG. 11 is a diagram illustrating a configuration example of a notification screen W30 to be displayed when the icon I10 displayed on either the print job execution screen W22 in FIG. 9 or the print job execution screen W24 in FIG. 10 is selected by a user.

The notification screen W30 includes an apparatus state display area R14. In the apparatus state display area R14, information related to the apparatus status of the multifunction peripheral 10 to be notified to the logged-in user or the like is displayed. For example, in addition to information related to the detection of a virus such as "A virus has been detected.", information related to the apparatus state such as "Load paper for replenishment." or "A paper jam has occurred." is displayed in the apparatus state display area R14, so that the logged-in user or the like can be alerted.

Figure 12:
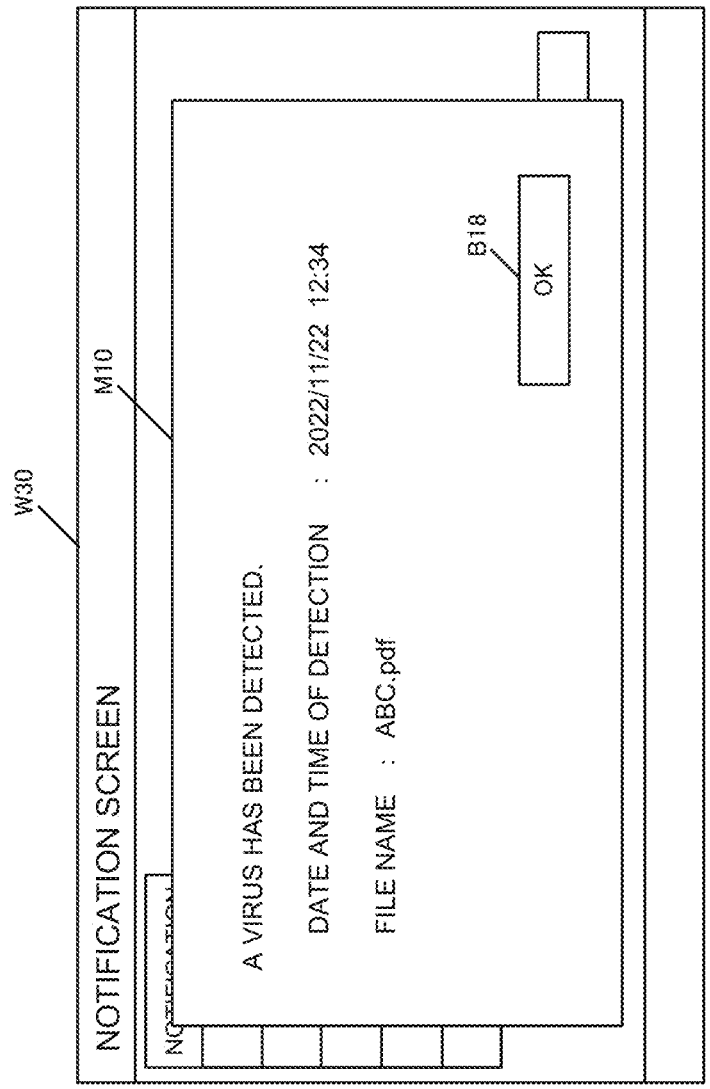
FIG. 12 is a diagram for describing an operation example according to the first embodiment.

FIG. 12 is a diagram illustrating an example of a display configuration of the pop-up message M10 to be displayed on the notification screen W30 by the controller 11 when the user selects the information related to the detection of a virus (shaded area in FIG. 11) displayed in the apparatus state display area R14 of the notification screen W30. The pop-up message M10 shown as an example in FIG. 12 may have the same configuration as the pop-up message M10 shown as an example in FIG. 8, and thus description thereof is omitted here.

As described above, according to the first embodiment, it is possible to vary the method for displaying the notification information depending on the user's login status. According to the first embodiment, if the controller determines that the user logged in to the multifunction peripheral at the time of the execution of the walk-up job is the executing user who has inputted the execution instruction for the walk-up job, the controller displays the notification information notifying that the data pertaining to the walk-up job is infected with a virus in the form of a pop-up message. If the controller determines that the user logged in to the multifunction peripheral at the time of the execution of the walk-up job is not the executing user who has inputted the execution instruction for the walk-up job, or if the controller determines that neither the executing user nor any other user is logged in to the multifunction peripheral at the time of the execution of the walk-up job, the controller indicates the fact that the data pertaining to the walk-up job is infected with a virus in the form of an icon for calling up the pop-up message on the print job execution screen. This configuration ensures that the user who has inputted the execution instruction for the walk-up job can quickly and accurately learn the fact that the data pertaining to the walk-up job is infected with a virus by seeing the pop-up message if the user is logged into the multifunction peripheral or by operating the icon to display the pop-up message if the user is not logged into the multifunction peripheral. This configuration also produces an effect of eliminating the risk of interfering with another user's operation because the pop-up message is not used to give the notification if a user other than the executing user is logged in to the multifunction peripheral or no user is logged in to the multifunction peripheral at the time of the detection of a virus.

2. Second Embodiment

In a second embodiment, the timing of displaying the notification information is varied according to the user's login status. According to the second embodiment, the controller restricts the display of the notification information if a user that is not the executing user is logged into the multifunction peripheral at the time of the detection of a virus or if neither the executing user nor any other user is logged into the apparatus at the time of the detection of a virus, and displays the notification information in the form of a pop-up message when the executing user logs in to the apparatus again.

2.1. Functional Configuration

The functional configuration of a multifunction peripheral according to the second embodiment may be the same as that of the multifunction peripheral 10 according to the first embodiment, and thus description thereof is omitted here.

2.2. Flow of Processing

Figure 13:
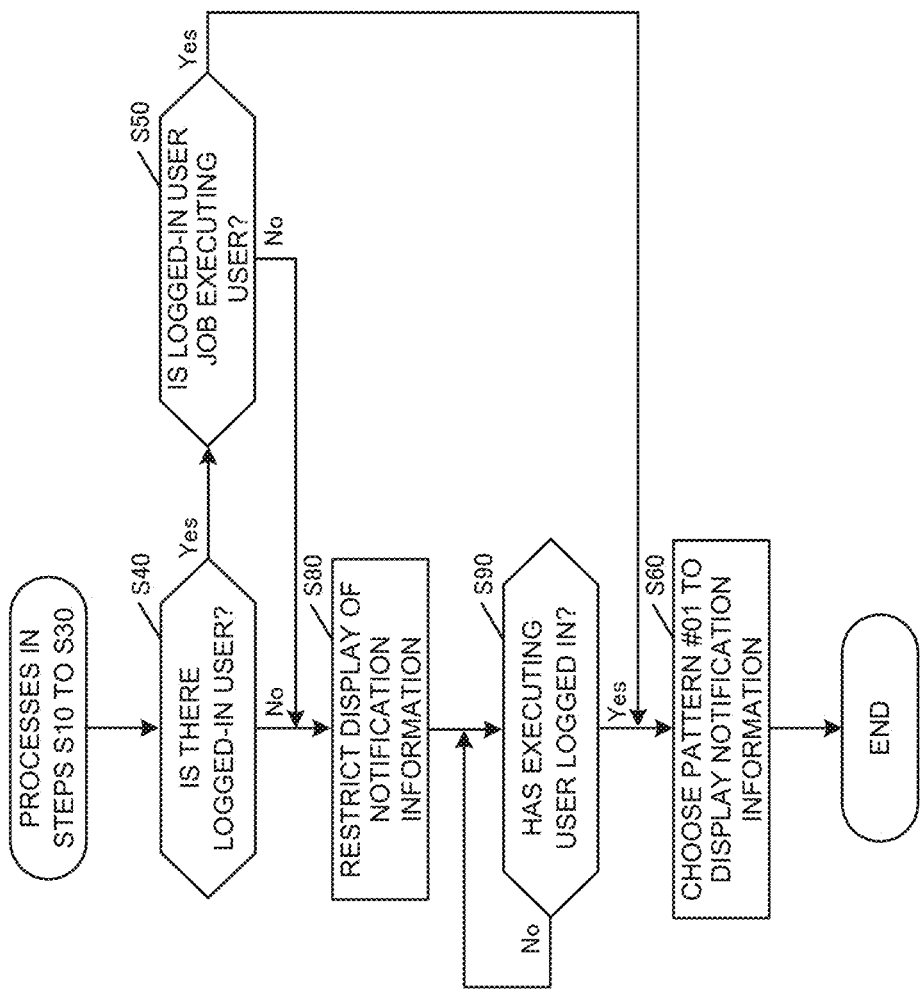
FIG. 13 is a flowchart for describing a flow of processing according to a second embodiment.

The flow of processing according to the second embodiment is represented by a flowchart in FIG. 13, which replaces the flowchart in FIG. 5 according to the first embodiment. Accordingly, the same step numbers as in the first embodiment are used for the same processes as those in the first embodiment, and description thereof may be omitted.

Upon determining that there is a user logged in to the multifunction peripheral 10, the controller 11 determines whether or not the logged-in user is the executing user who has inputted the execution instruction for the walk-up job (Yes in Step S40-->Step S50). Upon determining that the logged-in user is the executing user who has inputted the execution instruction for the walk-up job, the controller 11 chooses the notification method identified by the pattern "#01" shown as an example in FIG. 4 to display the notification information (Yes in Step S50-->Step S60).

On the other hand, upon determining that there is no user logged in to the multifunction peripheral 10 (No in Step S40), or upon determining that the logged-in user is not the executing user who has inputted the job execution instruction (No in Step S50), the controller 11 chooses to restrict the display of the notification information (Step S80).

Next, the controller 11 determines whether or not the executing user who has inputted the execution instruction for the walk-up job has logged in to the multifunction peripheral 10 again (Step S90).

Upon determining that the executing user has logged in to the multifunction peripheral 10, the controller 11 chooses the notification method identified by the pattern "#01" to display the notification information (Yes in Step S90-->Step S60). On the other hand, upon determining that the executing user has not logged in to the multifunction peripheral 10 again, the controller 11 waits until the executing user logs in to the multifunction peripheral 10 (No in Step S90).

2.3. Operation Examples

Figure 14:
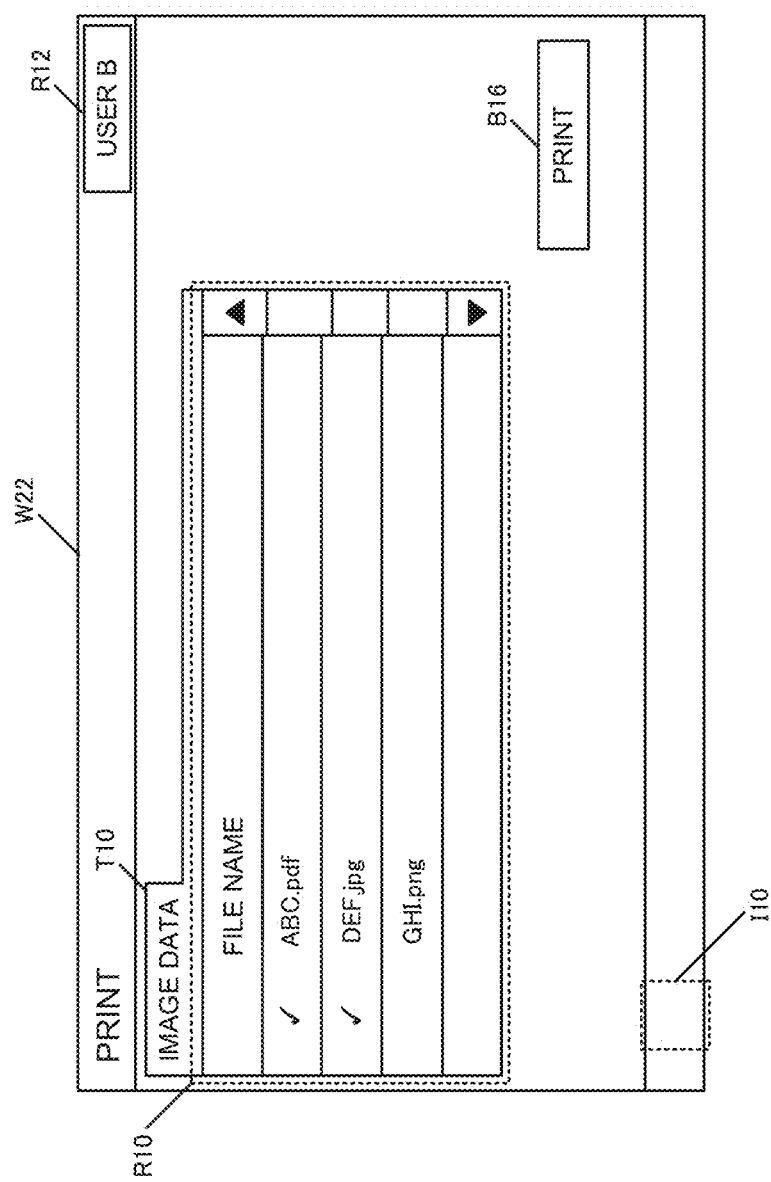
FIG. 14 is a diagram for describing an operation example according to the second embodiment.

The following describes operation examples according to the second embodiment. FIG. 14 is a diagram illustrating an operation example corresponding to the case where the controller 11 has determined that the user logged in to the multifunction peripheral 10 at the time of the execution of the walk-up job is not the executing user who has inputted the execution instruction for the walk-up job (corresponding to the processes in the case of No in Step S50-->Step S80 in FIG. 13).

Upon determining that the user logged in to the multifunction peripheral 10 at the time of the execution of the walk-up job (User B being displayed in the login user name display area R12) is not the executing user who has inputted the execution instruction for the walk-up job (User A (see the job management table in FIG. 3)), the controller 11 restricts the display of the notification information. In this case, unlike the first embodiment, the controller 11 does not indicate the fact that the data pertaining to the walk-up job is infected with a virus in the form of the icon I10 on the print job execution screen W22.

Figure 15:
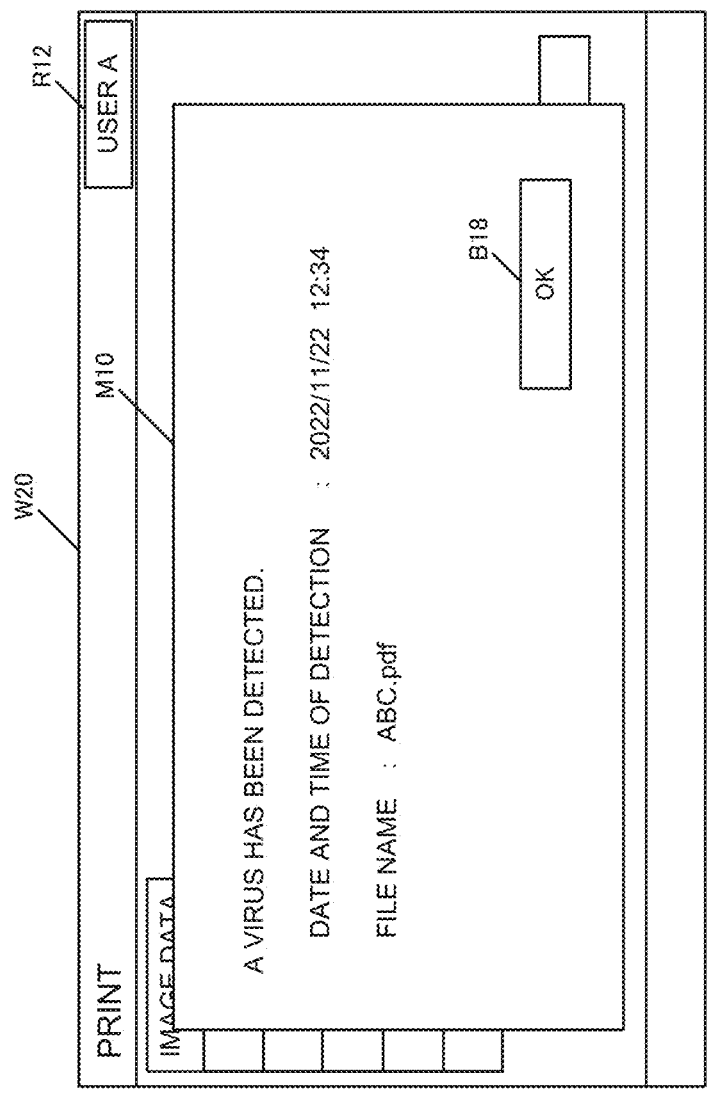
FIG. 15 is a diagram for describing an operation example according to the second embodiment.

FIG. 15 is a diagram illustrating an operation example corresponding to the case where the executing user who has inputted the execution instruction for the walk-up job has logged in to the multifunction peripheral 10 again (corresponding to the processes in the case of Yes in Step S90-->Step S60 in FIG. 13). In this case, the controller 11 displays the notification information notifying that the data pertaining to the walk-up job is infected with a virus in the form of the pop-up message M10 on the print job execution screen W20. Note that the pop-up message M10 to be displayed in the second embodiment may have the same configuration as the pop-up message shown as an example in FIG. 8, and thus description thereof is omitted here.

As described above, according to the second embodiment, the controller can restrict the display of the notification information if a user that is not the executing user is logged into the multifunction peripheral at the time of the detection of a virus or if neither the executing user nor any other user is logged into the apparatus at the time of the detection of a virus, and display the notification information in the form of a pop-up message when the executing user logs in to the apparatus again. Thus, this configuration allows the executing user who has inputted the walk-up job to quickly and accurately learn the fact that the data pertaining to the walk-up job is infected with a virus.

3. Third Embodiment

A third embodiment has the same configuration as the first embodiment or the second embodiment except that the third embodiment includes a determiner that determines a screen display situation in the display, and the controller controls the display of the notification information depending on the screen display situation at the time of a detection of a virus if the authentication function of the authenticator is disabled.

3.1. Functional Configuration

Figure 16:
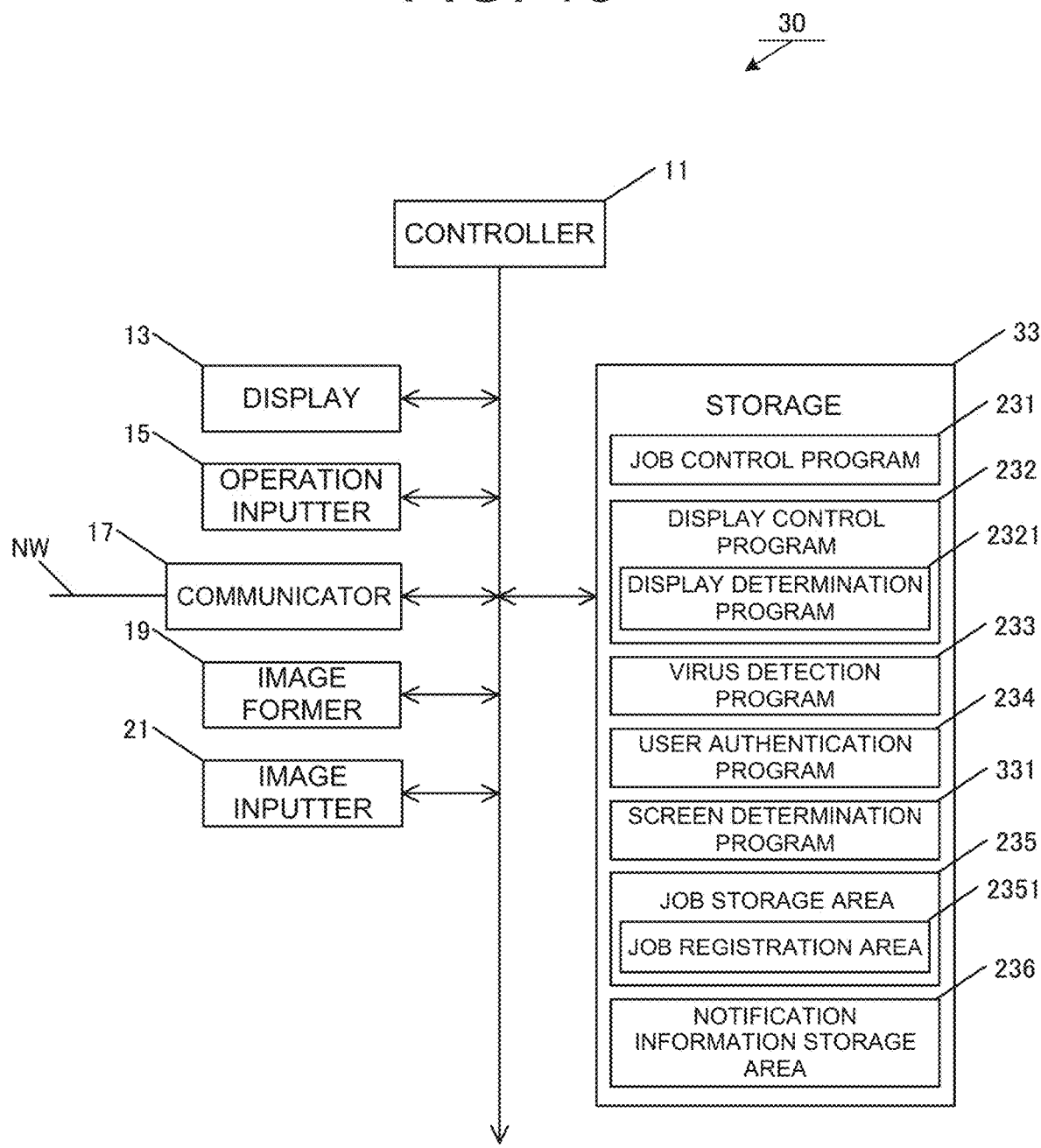
FIG. 16 is a diagram illustrating a functional configuration of a multifunction peripheral according to a third embodiment.

FIG. 16 is a diagram illustrating a functional configuration of a multifunction peripheral 30 according to the third embodiment. The multifunction peripheral 30 according to the third embodiment includes a storage 33 in place of the storage 23 of the multifunction peripheral 10 according to the first embodiment. Note that the same elements of configuration as those of the multifunction peripheral 10 are labeled with the same reference signs as those of the multifunction peripheral 10, and description thereof will be omitted.

The storage 33 of the third embodiment includes a job control program 231, a display control program 232, a virus detection program 233, a user authentication program 234, and a screen determination program 331. In the storage 33, a job storage area 235 and a notification information storage area 236 are reserved.

The controller 11 reads the screen determination program 331 when determining a screen being displayed on the display 13. The controller 11 that has read the screen determination program 331 functions as a determiner and determines a screen being displayed on the display 13 at the time of the execution of a walk-up job registered in a spool queue.

3.2. Flow of Processing

Figure 17:
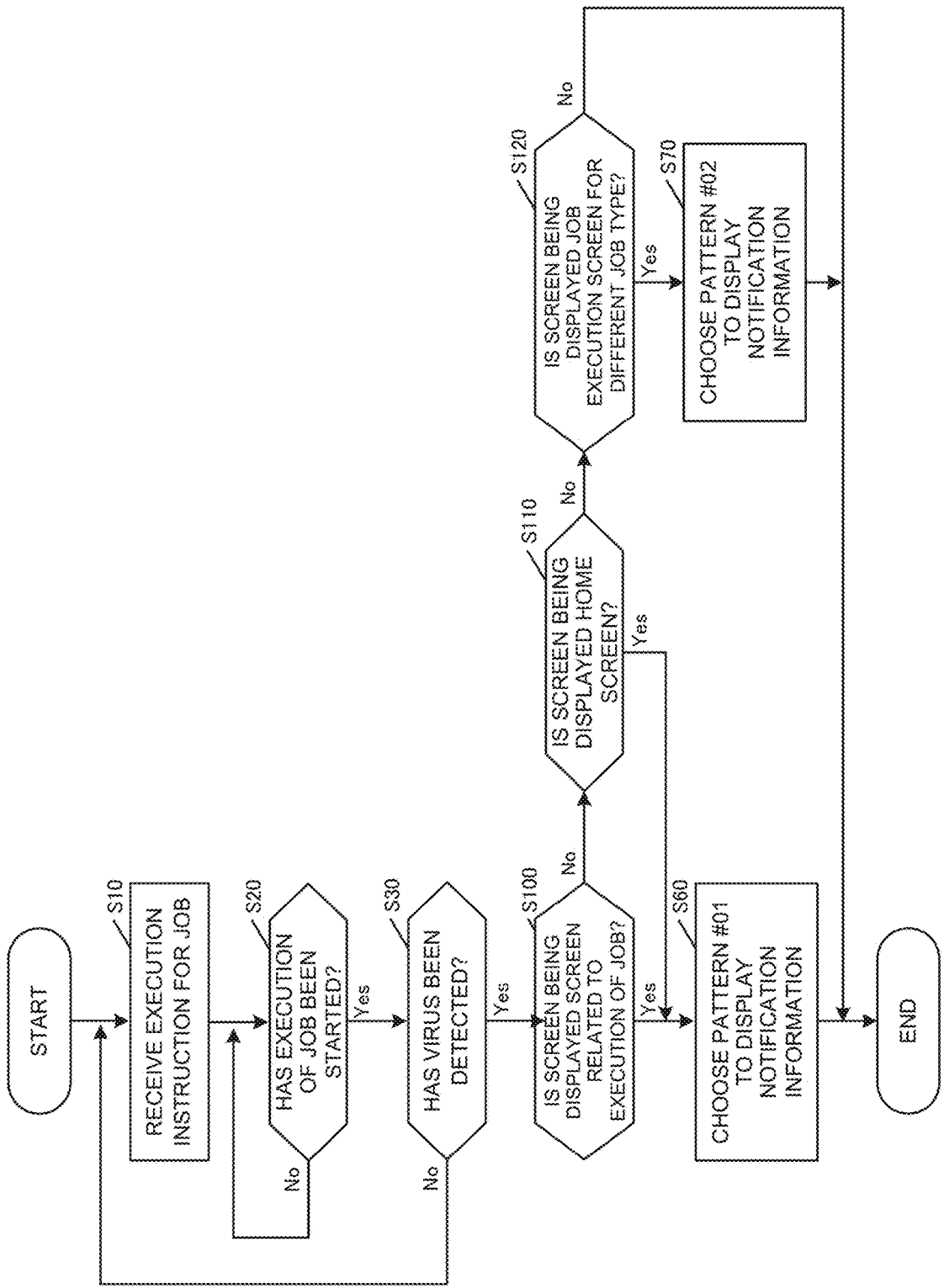
FIG. 17 is a flowchart for describing a flow of processing according to the third embodiment.

The flow of processing according to the third embodiment is represented by a flowchart in FIG. 17, which replaces the flowchart in FIG. 5 according to the first embodiment. Accordingly, the same step numbers as in the first embodiment are used for the same processes as those in the first embodiment in the following description. Note that the processing described below is performed when the user authentication function is disabled.

First, the controller 11 receives an execution instruction for a walk-up job inputted by a user (Step S10). Upon receiving the execution instruction inputted for the walk-up job, the controller 11 registers the thus received walk-up job in a spool queue.

Then, the controller 11 determines whether or not the execution of the walk-up job in the spool queue has been started (Step S20). Upon determining that the execution of the walk-up job has been started, the controller 11 determines whether or not a virus has been detected in data pertaining to the walk-up job (Yes in Step S20-->Step S30). Upon determining that the execution of the walk-up job has not been started, the controller 11 waits until it is time to execute the walk-up job (No in Step S20).

Upon determining that a virus has been detected in the data pertaining to the walk-up job for which the execution has been started, the controller 11 determines whether or not the screen being displayed on the display 13 is a job execution screen related to the execution of the walk-up job (for example, print job execution screen) (Yes in Step S30-->Step S100). On the other hand, upon determining that no virus has been detected in the data pertaining to the walk-up job for which the execution has been started, the controller 11 returns the processing to Step S10 and waits until an execution instruction for a walk-up job is inputted (No in Step S30-->Step S10). Note that upon determining that no virus has been detected in the data pertaining to the walk-up job for which the execution has been started, the controller 11 may omit processes in Step S100 and subsequent steps and terminate the processing.

Upon determining that the screen being displayed on the display 13 is a job execution screen related to the execution of the walk-up job, the controller 11 chooses the notification method identified by the pattern "#01" to display the notification information, assuming that the executing user who has inputted the execution instruction for the walk-up job is in front of the multifunction peripheral 10 (Yes in Step S100-->Step S60).

On the other hand, upon determining that the screen being displayed on the display 13 is not a job execution screen related to the execution of the walk-up job, the controller 11 determines whether or not the screen being displayed is a home screen, which is a default screen (No in Step S100-->Step S110). Upon determining that the screen being displayed is the home screen, which is a default screen, the controller 11 chooses the notification method identified by the pattern "#01" to display the notification information, assuming that no one is using the multifunction peripheral 10 and the screen has automatically returned to the default screen (Yes in Step S110-->Step S60).

Upon determining that the screen being displayed on the display 13 is not the home screen, which is a default screen, the controller 11 determines whether or not the screen being displayed is a job execution screen related to a job that belongs to a job type different from that of the walk-up job for which the execution instruction has been received (No in Step S110-->Step S120). Upon determining that the screen being displayed is a job execution screen related to a job that belongs to a different job type, the controller 11 determines that a user that is not the executing user who has inputted the execution instruction for the walk-up job is using the multifunction peripheral 10, and chooses the notification method identified by the pattern "#02" to display the notification information (Yes in Step S120-->Step S70). Upon determining that the screen being displayed is not a job execution screen related to a job that belongs to a different job type, the controller 11 terminates the processing (No in Step S120-->End).

3.3. Operation Examples

Figure 18:
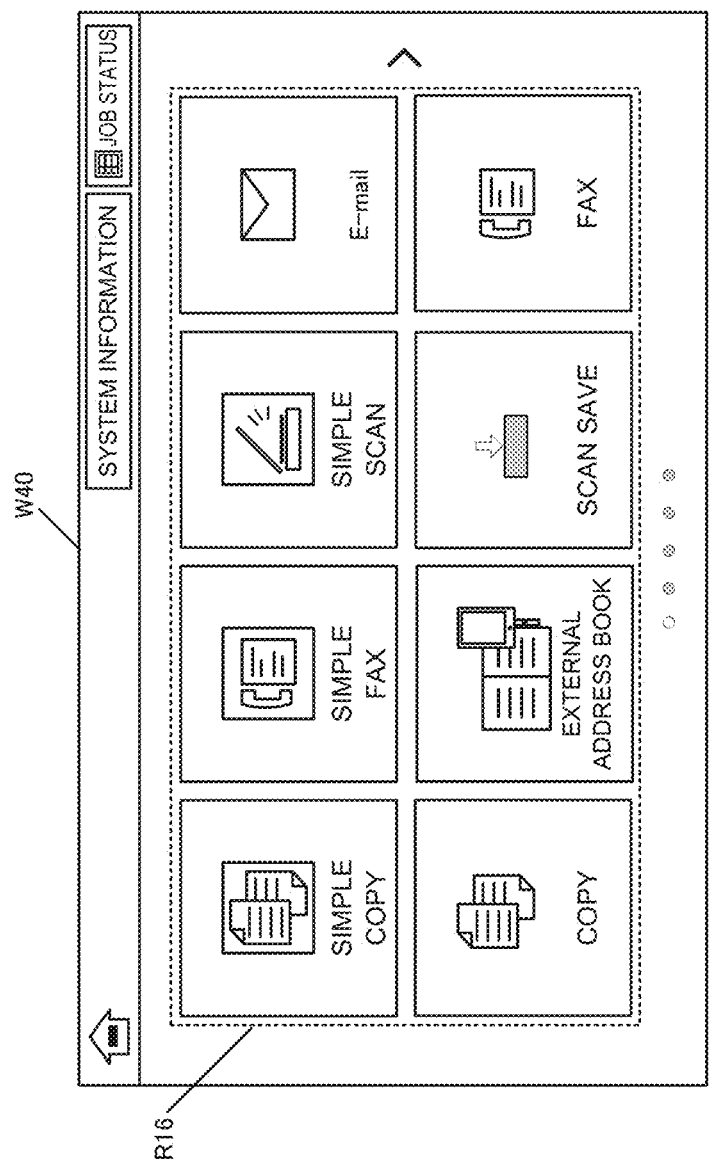
FIG. 18 is a diagram for describing an operation example according to the third embodiment.

The following describes operation examples according to the third embodiment. FIG. 18 is a diagram illustrating a configuration example of a home screen W40 displayed as a default screen on the display 13 by the controller 11. Note that FIG. 18 represents an operation example corresponding to the process in Step S110 in FIG. 17.

The home screen W40 includes a function selection area R16. In the function selection area R16, a collection of selection buttons are displayed for receiving selection instructions to select any of functions (setting screens) related to job execution or to refer to an external address book, for example. The selection buttons have a screen configuration that provides illustration of respective functions using graphics, letters/numbers, or symbols. In response to the user selecting (pressing) a selection button, the controller 11 displays a setting screen or an information display screen for the function corresponding to the selection button.

The function selection area R16 shown in FIG. 18 is an example that has a configuration including selection buttons for receiving a selection of any of Simple Copy, Simple Fax, Simple Scan, E-mail, Copy, Scan Save, or Fax, and a selection button for receiving a selection of reference to an external address book. The word "Simple" in "Simple Copy", for example, as used herein indicates that the function allows for a simplified job execution-related operation by intentionally disabling configuration of setting values (setting items) that can be selected in normal copy (or configuring such setting values as fixed default settings). By selecting Simple Copy as a job, for example, the user can easily execute a copy job without having to configure complicated settings. Since setting values (setting items) that can be configured on a setting screen for a simple function such as Simple Copy and those for a corresponding normal function such as Copy differ from each other, screen configurations of the setting screens also differ from each other.

Figure 19:
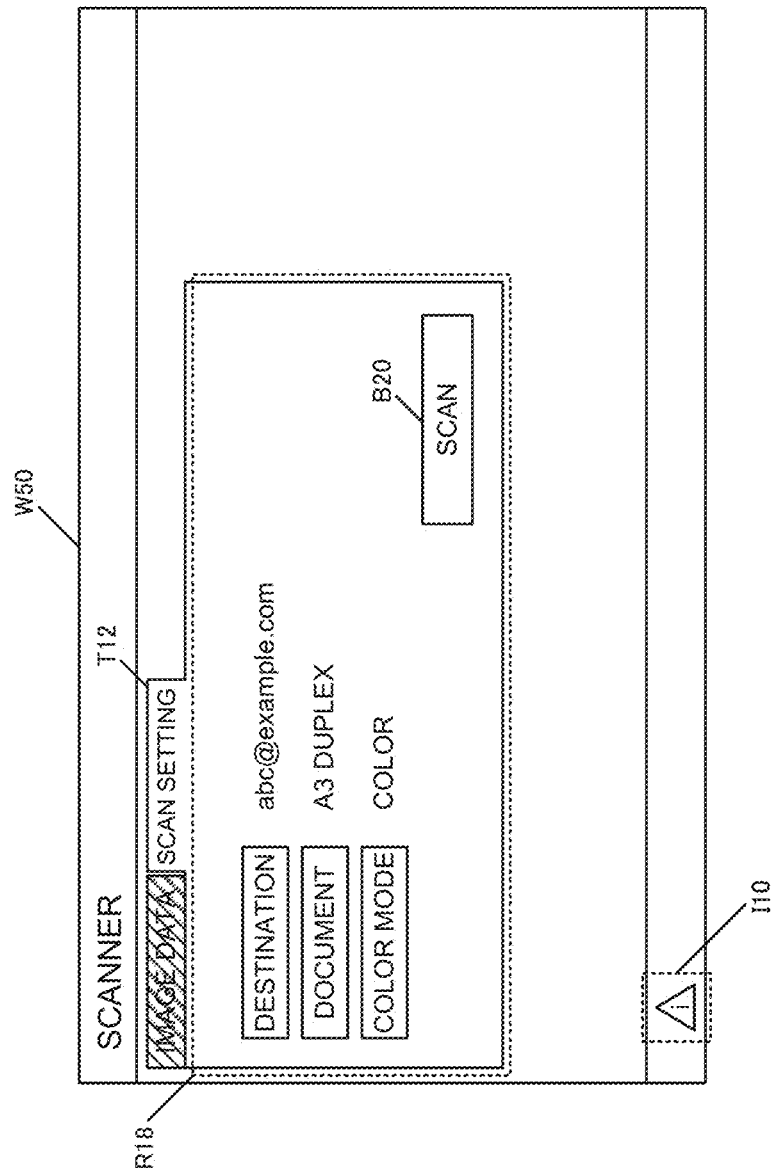
FIG. 19 is a diagram for describing an operation example according to the third embodiment.

FIG. 19 is a diagram illustrating a configuration example of a scan job execution screen W50 for a job that belongs to a job type different from that of the walk-up job (for example, print job). Note that FIG. 19 represents an operation example corresponding to the process in Step S120 in FIG. 17. The scan job execution screen W50 includes a scan setting tab T12 and a scan button B20. In this case, the controller 11 indicates the fact that the data pertaining to the walk-up job is infected with a virus in the form of the icon I10 on the scan job execution screen W50.

The scan setting tab T12 receives input related to scan settings. The scan setting tab T12 includes a scan setting input area R18 for receiving input related to scan settings. The scan setting input area R18 includes, as setting items, "Destination" for receiving input of a setting for a destination to which image data generated through document reading using the scanner is transmitted, "Document" for receiving input of a setting for the type of a document to be read, and "Color mode" for receiving input of a setting for a color mode to be used when the document is read using the scanner. FIG. 19 is a diagram illustrating an example in which "abc@example.com" is set as the destination, "A3 duplex" as the document, and "color" as the color mode.

The scan button B20 receives an instruction to start document reading using the scanner. In response to the user selecting the scan button B20, the controller 11 starts document reading using the scanner.

As described above, according to the third embodiment, it is possible to control the display of the notification information depending on the screen display situation at the time of a detection of a virus. According to the third embodiment, if the controller determines that the screen being displayed is a job execution screen related to the execution of the walk-up job, or if the controller determines that the screen being displayed is the home screen, which is a default screen, the controller displays the notification information notifying that the data pertaining to the walk-up job is infected with a virus in the form of a pop-up message. If the controller determines that the screen being displayed is not a job execution screen related to the execution of the walk-up job, the controller indicates the fact that the data pertaining to the walk-up job is infected with a virus in the form of an icon for calling up the pop-up message on the job execution screen. According this configuration, the notification information notifying that the data pertaining to the walk-up job is infected with a virus is displayed in the form of a pop-up message only when it is assumed that the executing user who has inputted the walk-up job is operating the multifunction peripheral or when it is assumed that no one is operating the multifunction peripheral. Thus, this configuration allows the executing user to quickly and accurately learn the fact that the data pertaining to the walk-up job is infected with a virus, producing an effect of eliminating the risk of interfering with another user's operation.

The present disclosure is not limited to the foregoing embodiments, and various modifications may be made. That is, the technical scope of the present disclosure also includes an embodiment obtained by combining technical measures modified as appropriate without departing from the gist of the present disclosure.

Although some parts of the foregoing embodiments are described separately for convenience of explanation, it is needless to say that such embodiments may be combined and implemented within a technically allowable range.

The program(s) that operates on each device (apparatus) in the foregoing embodiments is a program that controls the CPU or the like (program that causes a computer to function) so as to implement the functions according to the foregoing embodiments. According to the embodiments, it is assumed that each device (apparatus) simultaneously executes a plurality of programs as needed by multitask processing. Information handled by each device (apparatus) is temporarily accumulated in a temporary storage device (for example, RAM)) during processing, is then stored in various storage devices such as read only memory (ROM) and an HDD, and is read, corrected, and written by the CPU as needed.

Here, a recording medium that stores the program may be, for example, any of a semiconductor medium (for example, ROM and a non-volatile memory card), an optical recording medium/magneto-optical recording medium (for example, Digital Versatile Disc (DVD)), a Magneto Optical Disc (MO), a Mini Disc (MD), a Compact Disc (CD), and a Blu-ray (registered trademark) Disc (BD)), and a magnetic recording medium (for example, a magnetic tape and a flexible disk). Furthermore, not only are the functions of the foregoing embodiments implemented through execution of the loaded program, but the functions of the present disclosure may also be implemented through processing performed in cooperation with, for example, an operating system or other application programs on the basis of instructions of the program.

For market distribution, the program may be stored and distributed in a portable recording medium or transferred to a server computer connected via a network such as the Internet. In this case, a storage device of the server computer is obviously included in the present disclosure.

What is claimed is:

1. An image forming apparatus comprising:
    a display;
    an authenticator that authenticates a user's login to the image forming apparatus;
    an image former that forms an image based on a job for which an execution instruction has been inputted by the user;
    a detector that performs virus detection at execution of the job; and
    one or more controllers that control display of notification information that notifies a detection of a virus, wherein the one or more controllers control the display of the notification information depending on the user's login status on the image forming apparatus at the time of the detection of a virus.

2. The image forming apparatus according to claim 1, wherein the one or more controllers display the notification information in a form of a pop-up message if the user who has inputted the execution instruction is logged into the image forming apparatus at the time of the detection of a virus by the detector.

3. The image forming apparatus according to claim 1, wherein the one or more controllers display an icon for receiving an instruction to display the notification information if a user that is not the user who has inputted the execution instruction is logged in to the image forming apparatus at the time of the detection of a virus by the detector or if neither the user who has inputted the execution instruction nor any other user is logged in to the image forming apparatus at the time of the detection of a virus by the detector.

4. The image forming apparatus according to claim 1, wherein the one or more controllers restrict the display of the notification information if a user that is not the user who has inputted the execution instruction is logged in to the image forming apparatus at the time of the detection of a virus by the detector or if neither the user who has inputted the execution instruction nor any other user is logged in to the image forming apparatus at the time of the detection of a virus by the detector, and displays the notification information in a form of a pop-up message when the user who has inputted the execution instruction logs in to the image forming apparatus again.

5. The image forming apparatus according to claim 1, further comprising a determiner that determines a screen display situation in the display, wherein
the one or more controllers control the display of the notification information depending on the screen display situation at the time of the detection of a virus if an authentication function of the authenticator is disabled.

6. The image forming apparatus according to claim 5, wherein the one or more controllers display the notification information in a form of a pop-up message if a screen being displayed on the display at the time of the detection of a virus by the detector is a default screen or a screen that has received the user's input of the execution instruction.

7. The image forming apparatus according to claim 5, wherein the one or more controllers display an icon for receiving an instruction to display the notification information if a screen being displayed on the display at the time of the detection of a virus by the detector is a screen for a job type different from that of a screen that has received the user's input of the execution instruction.

8. The image forming apparatus according to claim 1, wherein the job is a print job for which the user directly inputs an execution instruction to the image forming apparatus.

9. A method for notifying a detection of a virus, the method comprising:
authenticating a user's login to an apparatus;
forming an image based on a job for which an execution instruction has been inputted by the user;
performing virus detection at execution of the job; and
controlling display of notification information that notifies a detection of a virus, wherein
the display of the notification information is controlled depending on the user's login status on the apparatus at the time of the detection of a virus.

\* \* \* \* \*